United States Patent [19]
Stoddard

[11] Patent Number: 6,123,976
[45] Date of Patent: *Sep. 26, 2000

[54] PROCESS FOR PRODUCING BEVERAGES FROM NUT BUTTER AND THE PRODUCT THEREFROM

[75] Inventor: Michael G. Stoddard, Roseville, Calif.

[73] Assignee: California Almond Growers Exchange, Sacramento, Calif.

[ * ] Notice: This patent issued on a continued prosecution application filed under 37 CFR 1.53(d), and is subject to the twenty year patent term provisions of 35 U.S.C. 154(a)(2).

[21] Appl. No.: 09/020,824

[22] Filed: Feb. 9, 1998

[51] Int. Cl.[7] .............................. A23L 2/38; A23L 1/36; A23L 1/38; A23L 1/20
[52] U.S. Cl. ..................... 426/598; 426/632; 426/633; 426/634
[58] Field of Search .................................. 426/634, 598, 426/632, 633

[56] References Cited

U.S. PATENT DOCUMENTS

| | | |
|---|---|---|
| 4,129,664 | 12/1978 | Kruseman et al. . |
| 4,639,374 | 1/1987 | Matsunobu et al. . |
| 4,839,193 | 6/1989 | Mange et al. . |
| 5,433,970 | 7/1995 | Wong et al. . |
| 5,490,999 | 2/1996 | Villagran et al. . |
| 5,508,057 | 4/1996 | Wong et al. . |
| 5,520,950 | 5/1996 | Rosenplenter . |
| 5,567,454 | 10/1996 | Bogdan . |

OTHER PUBLICATIONS

Patent Abstracts of Japan, Abs Grp No: C148, vol. 7, No. 22 for Application 56–6068. Inventor: Kawahara, Jan. 28 1983.

Primary Examiner—Anthony J. Weier
Attorney, Agent, or Firm—Boutin, Dentino, Gibson, Di Giusto, Hodell & West; R. Michael West

[57] ABSTRACT

A non-dairy, nut-based beverage concentrate and a directly consumable product, and processes for producing same. At least two or more certain essential ingredients are mixed with and dispersed throughout nut butter. These essential ingredients ensure that the consumable beverage will exhibit and maintain for long periods of time, the desired characteristics of a milk-like beverage. Optional ingredients such as sugar, flavoring, vitamins, salt, and the like may also be added to the mixture. Potable water is then added to the nut butter mixture, and the combination is subjected to high shear mixing, producing an unprocessed nut beverage. Finally, pasteurization, partial cooling, homogenizing, and further cooling are undertaken, and the resultant fully processed nut beverage may be packaged, using aseptic or refrigerated methods.

44 Claims, 5 Drawing Sheets

| ALMOND BEVERAGE STABILITY AFTER 292 HOURS ||||| 
|---|---|---|---|---|
| SAMPLE | SEDIMENT | HOMOGENEOUS | NONHOMOGENEOUS | CREAM |
| 1 | 1 | 99 | 0 | 0 |
| 2 | 2 | 97 | 0 | 1 |
| 3 | 0 | 0 | 100 | 0 |
| 4 | 1 | 0 | 99 | 0 |
| 5 | 1 | 99 | 0 | 0 |
| 6 | 0 | 0 | 100 | 0 |
| 7 | 3 | 95 | 0 | 2 |
| 8 | 3 | 96 | 0 | 1 |

*Fig. 4C*

| SAMPLE | CITRATE | LECITHIN | CARRAGEANAN | ALMOND BEVERAGE STABILITY IN STRONG COFFEE ||||||
|---|---|---|---|---|---|---|---|---|---|
| | | | | STABILITY AFTER 0 MINUTES | STABILITY AFTER 1 MINUTES | STABILITY AFTER 3 MINUTES | STABILITY AFTER 10 MINUTES | STABILITY AFTER 20 MINUTES | STABILITY AFTER 60 MINUTES |
| 1 | X | X | X | + | + | + | + | + | + |
| 2 | | X | X | + | - | - | - | - | - |
| 3 | | X | | + | - | - | - | - | - |
| 4 | | | X | + | - | - | - | - | - |
| 5 | X | | X | + | + | + | + | + | + |
| 6 | | | | + | - | - | - | - | - |
| 7 | X | | | + | - | - | - | - | - |
| 8 | X | X | | + | - | - | - | - | - |

KEY

"+" SIGN INDICATES THAT ALMOND BEVERAGE WAS STABLE

"-" SIGN INDICATES THAT ALMOND BEVERAGE WAS UNSTABLE

*Fig. 5*

PROCESS FOR PRODUCING BEVERAGES FROM NUT BUTTER AND THE PRODUCT THEREFROM

BACKGROUND OF THE INVENTION

1. Field of the Invention

The invention relates generally to the field of non-dairy beverages, produced from natural foodstuff. More specifically, the invention provides a process for combining nut butter with water and other essential ingredients, in predetermined amounts, resulting in a stable, pleasant tasting beverage.

2. Description of Prior Art

A. Nut-Based Beverages

Efforts to utilize nuts as the primary ingredient of a beverage, have not previously met with great success. One prior art process called for mixing ground nuts, in the form of a powder, with water, milk, or other dairy products to achieve a beverage consistency. Artificial ingredients were also added to such beverages to overcome taste and odor objections. But other problems still existed. For example, these nut powder beverages exhibited poor dispersement during mixing with other fluids, and poor suspension characteristics during storage. In addition, prior art nut beverages have demonstrated instability when subjected to heat, and oil separation when left in storage over an extended period of time. Lastly, functional compatibility problems have also been noted, when these powder-based beverages are mixed or used in conjunction with other foods or beverages, such as cereal or hot coffee.

B. Vegetable, Fruit, And Grain-Based Beverages

The prior art also teaches the production of vegetable, fruit, or grain-based non-dairy beverages. More particularly, such beverages have been made from soy beans, oats, rice, and a variety of fruit, including bananas, mangoes, and strawberries. Even though non-dairy, many of these beverages must be refrigerated to prevent spoilage. They also exhibit limited storage life even when refrigerated. Consumers have objected to an unpleasant "beany" or grainy taste, which characterizes many of these beverages.

C. Nut Butter, As A Food Product, A Food Spread, And A Food And Beverage Ingredient Nut butters, processed from a wide variety of nuts including peanuts, almonds, Macadamia nuts, and hazelnuts, have been produced for many years. The first step in producing nut butters is to roast the nuts to a moisture content typically less than 4%. Nuts such as almonds or hazelnuts may be left in a natural state with skin, or blanched with the skin removed, prior to roasting. After the roasting process is completed, the roasted nuts are ground to the desired consistency. Through grinding, nutseed oil is released and the nut meat is reduced to a small particle size. The combination of the oil and the particles forms a paste, also known as nut butter.

Traditionally, nut butters have been used as food ingredients, food spreads, and filling for food products. However, one effort to produce a beverage from almond nut paste is disclosed in U.S. Pat. No. 4,639,374, issued to Matsunobu, et al. The almond nut paste in the '374 Patent is produced from unskinned, dry-roasted or oil-roasted almond nuts, ground to a fine consistency. Two surfactants are added to the nut paste to disperse fat released from the ground nuts into milk. One surfactant is a lipophilic, and the other is a hydrophilic, respectively, to attract fat and water. To make almond milk, the '374 Patent teaches that water, almond paste, sugar, and commercially marketed milk should be mixed together and emulsified. This process results in an almond-based beverage which includes both a dairy product and a chemical surfactant (polyoxyethyene sorbitan), as several of its ingredients.

However, the need exists for a natural, non-dairy nut-based beverage, which need not be refrigerated and which exhibits superior shelf life and stability.

The need also exists for a nut-based beverage which has a pleasant taste, and can be combined with other natural flavors to provide a wide variety of flavored beverages.

The need further exists for a nut-based beverage produced from nut butters, in which the nut butters are combined with water and predetermined amounts of essential non-dairy natural ingredients, for emulsifying, dispersing, and stabilizing the beverage.

The need also exists for a process and nut-based beverage product resulting from use of the process, in which the beverage product can be readily manufactured both in a directly consumable form, and in a concentrated industrial form.

These and other objects of the invention will be taught by the disclosure to follow.

SUMMARY OF THE INVENTION

In carrying out the process and manufacturing the product of the present invention, nut butters are combined with: (1) water, or water-based beverages, such as tea, coffee, or fruit juices; and, (2) predetermined amounts of essential, non-dairy natural ingredients. These non-dairy ingredients function as an emulsifier, a dispersant, and a stabilizer for the resultant nut-based beverage. Other natural ingredients which may optionally be added to the beverage include nutrient minerals, sugar, salt, vitamins, and flavors.

Two versions of both the process and the product are disclosed herein. One version results in a beverage concentrate, whereas the other produces a directly consumable form of the beverage. The beverage concentrate may be shipped and stored in large containers, and then subsequently mixed with water and other ingredients to produce a consumable beverage. The directly consumable form of the product may be packaged either as an aseptic nut beverage, or as a refrigerated nut beverage.

The combination of nut butter with at least two ingredients from a selected group of essential ingredients, results in a nutritious, non-dairy nut beverage, having superior characteristics over the known prior art. Because the present beverage is a non-dairy product, health problems associated with lactose, cholesterol, saturated fats, certain allergies, and traces of growth hormones in dairy products, are avoided. While overcoming the problems of prior art beverages discussed above, the present nut beverage nevertheless appears similar to dairy milk, and exhibits a pleasant, nutty flavor.

DETAILED DESCRIPTION OF THE PREFERRED EMBODIMENT

Both the process and the product described herein require that a nut butter first be produced, from a selected nut product. It is contemplated that almonds, hazelnuts, pistachios, cashews, peanuts, pecans, walnuts, Brazil nuts, and Macadamia nuts are all suitable nuts for making the nut-based beverage herein. The selected nuts may be natural with skin, or blanched with the skin removed.

The process 10 for making the nut beverage concentrate 11, will first be described. Making reference to the flow chart shown in FIG. 1, an initial step is selecting 12 one or more varieties of nuts to be processed into the beverage concentrate. The selected nuts are then subjected either to dry roasting or oil roasting 13, until they contain less than 4% moisture. Dry roasting is preferred to oil roasting, because the resultant nuts do not contain the additional oil absorbed during the oil roasting process. This additional oil may make homogenization and stabilization of the beverage more difficult, and adds additional, unwanted fat.

Figure 1:
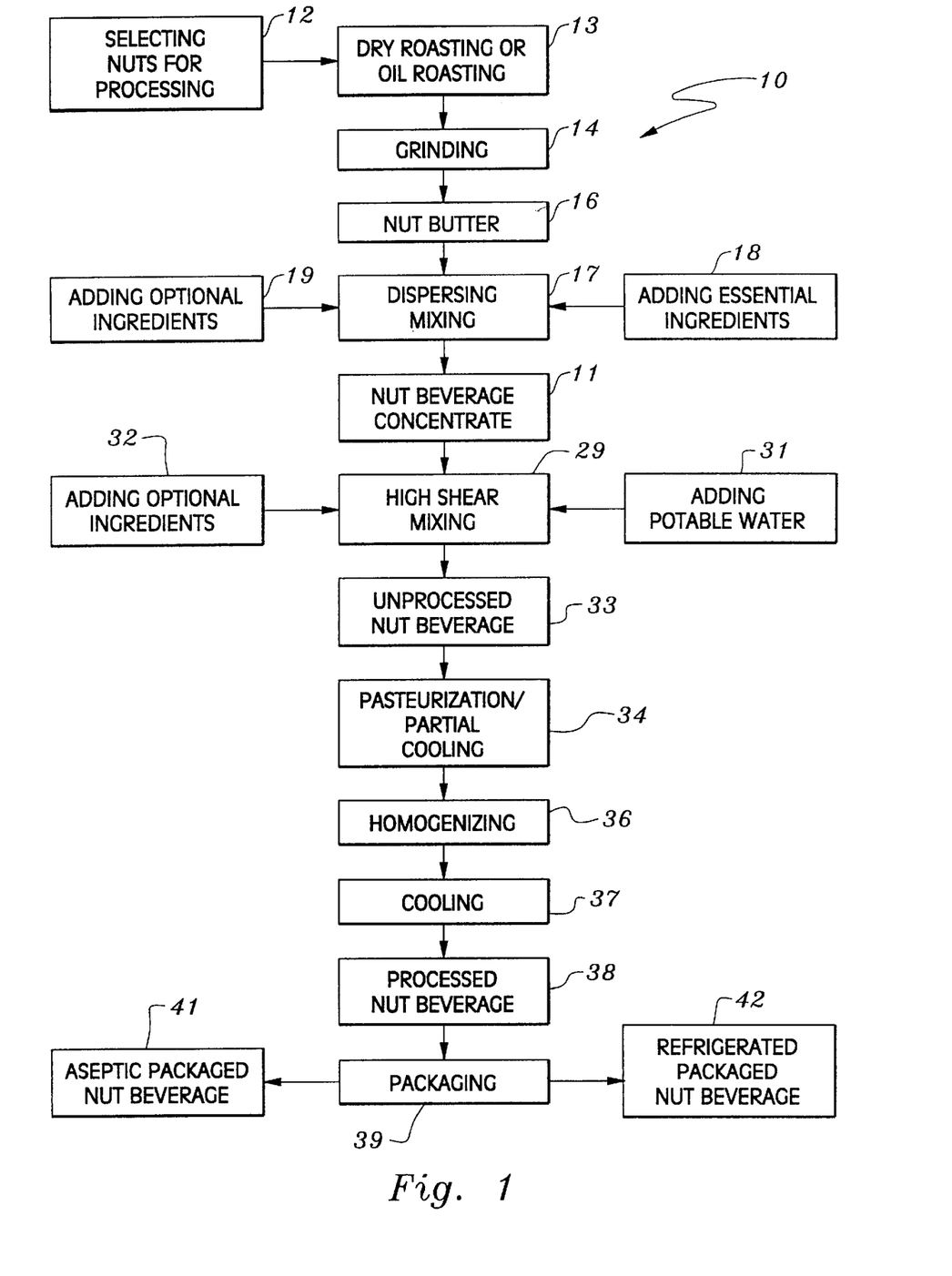
FIG. 1 is a flow chart showing the process for producing both a nut beverage concentrate and a nut beverage.

Although the particular moisture content of the roasted nuts is not critical, it must be low enough to facilitate the next step, namely, grinding 14 the nuts into a nut butter 16, having suitable particle size. If the moisture content is too high, the grinding process will be ineffective in producing a nut butter suitable for practicing the present invention.

Figure 3:
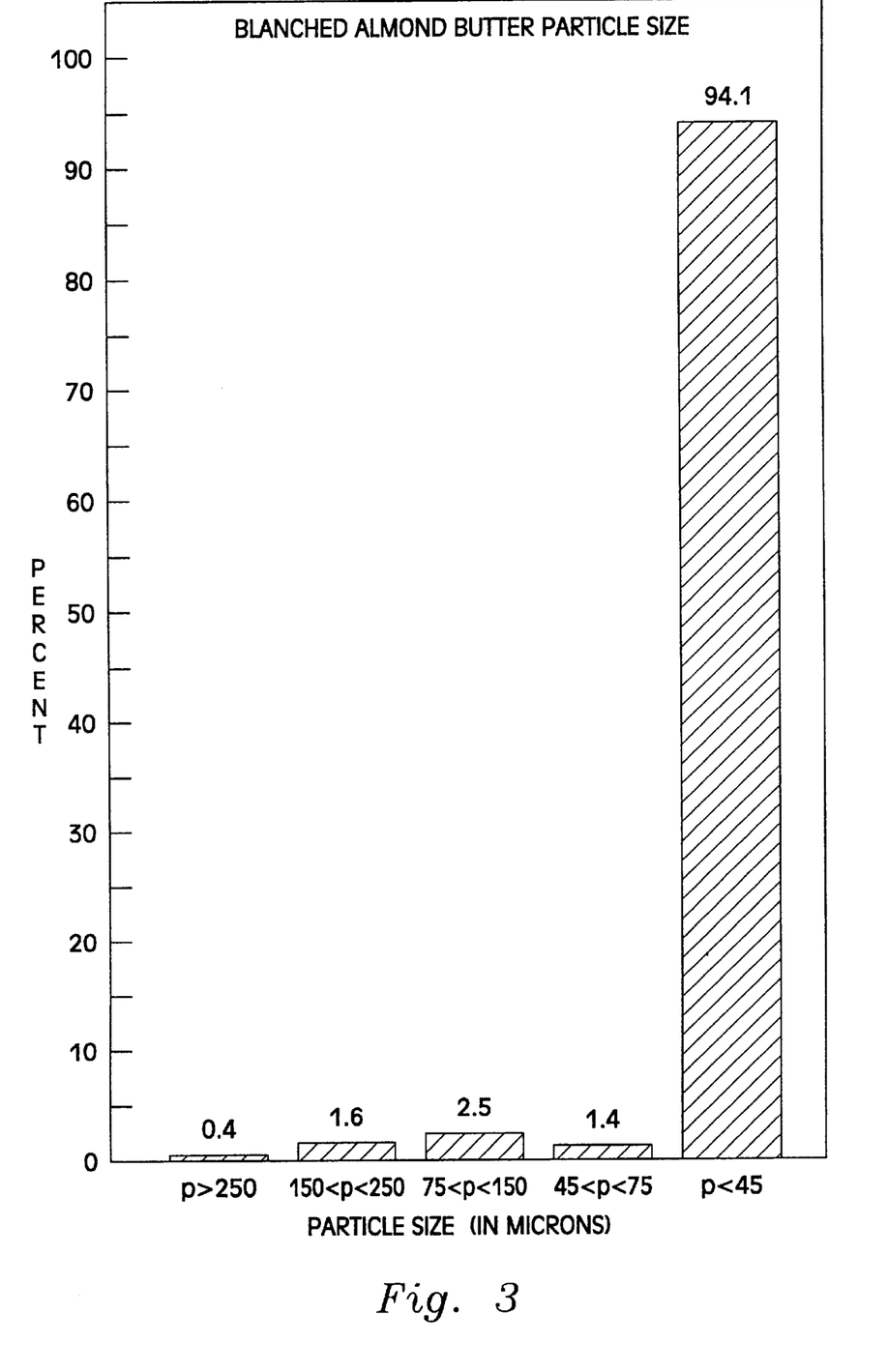
FIG. 3 is a graph depicting typical particle size distribution, resulting from the production of an almond nut butter, contemplated for use herein.

The particle size within the nut butter must be sufficiently small to achieve a stable suspension and emulsion, as well as a smooth "mouthfeel" for the consumer. This small particle size, in combination with certain ingredients discussed herein, may be used to produce a beverage having a viscosity resembling that of milk. A typical particle size distribution for blanched almond nut butter is illustrated in FIG. 3, graphing particle size in microns against the relative percentage present in the nut butter. It is apparent that the vast majority of particle sizes does not exceed 45 microns, although small numbers of particles are present in sizes exceeding 250 microns.

Grinding 14 is carried out using available apparatus and known techniques for producing nut butters, using rollers, balls, cones, or blades. During the grinding process, nutseed oil is released. This oil combines with the small particles described above to form the nut butter paste.

It is preferable that the nut butter used in the present process does not include any additives such as hydrogenated vegetable oil. Such additives may have a deleterious effect upon the particle suspension and functional compatibility characteristics of the nut beverage disclosed herein. Products including hydrogenated vegetable oil are also generally recognized as more difficult for the body to metabolize. However, other ingredients, such as sugar and salt, which do not interfere with the resultant beverage's desirable characteristics, may be included in the nut butter.

In a next stage of dispersing/mixing 17, selected essential ingredients 18 are added to the nut butter 16. The group of essential ingredients includes: (1) a citrate salt, selected from the sub-group including potassium or sodium citrate; (2) a natural, non-hydroxylated, soy lecithin emulsifier; and, (3) a natural gum, preferably carrageenan (alternatively, spelled "carrageenin"). At least two of these essential ingredients, or their equivalents, must be used together, and within a predetermined range of relative weights, per part of nut butter, to achieve the product characteristics desired herein. These predetermined ranges which provide acceptable results in accordance with the teachings of the present invention have been determined experimentally.

The citrate salt ingredient should be present in the amount of approximately 0.005 to 0.3 parts by weight, to one part of nut butter. The citrate salt disperses nut solids, such as fiber and protein, and provides a stable suspension of those solids within the beverage. Without this ingredient, rapid agglomeration and precipitation of the nut solids will occur, and the nut-beverage will not function properly in applications with solid foods. One such food application is using the nut beverage in lieu of milk, in combination with cereal. It should also be noted that the use of potassium citrate rather than sodium citrate, will result in a beverage having an overall lower sodium content, a characteristic desirable for many special diets.

The second ingredient in the group is a natural, non-hydroxylated soy lecithin emulsifier. This emulsifier should be present in the amount of approximately 0.002 to 0.3 parts by weight, to one part of nut butter. One function of the lecithin is to facilitate the production of an emulsion, containing nut oil and water. Because the lecithin has an affinity both for fat and water, it prevents separation of the oil from the nut beverage which is ultimately produced from the nut butter. The lecithin also imparts a desirable smoothness to the nut beverage of the present invention.

The lecithin must have an HLB (Hydrophilic-Lipophilic Balance) within the range of 4–10, and be able to withstand the high temperatures associated with pasteurization and thermal processing that the resultant nut beverage later undergoes. It is commercially desirable that the soy lecithin has a mild flavor, to avoid masking the nut flavor of the concentrate, and the beverage made therefrom. Also, excessive amounts of lecithin in relation to the nut content of the concentrate, will result in a beverage having an undesirable soy flavor.

The third ingredient in the group is a natural gum, preferably carrageenan. This gum should be present in the amount of approximately 0.002 to 0.25 parts by weight, to one part of nut butter. Carrageenan is a family of water-soluble carbohydrates extracted from natural seaweed. There are three basic types of carrageenan, Kappa, Iota, and Lambda, each derived primarily from a different variety of seaweed. Each type of carrageenan exhibits different physical and chemical properties when dissolved in water, owing to individual differences in their chemical properties. These properties can include: jelling, viscosity control, particulate suspension, emulsion stabilization, and moisture binding. A blend of Kappa and Iota carrageenan varieties has been determined effective to provide the desired properties in the beverage disclosed herein.

Carrageenan functions as a stabilizer, by suspending solids which are present in the nut beverage. This function is particularly important because surfactants are ineffective to suspend such solids. If not effectively suspended, these solid particles will agglomerate and precipitate over time, and also interfere with the functional compatibility of the nut beverage when used with cereal or coffee. In addition, natural gum provides a degree of viscosity, smoothness, and "mouthfeel" to the nut beverage, all of which enhance the consumer's perception of the beverage as a milk-like product.

Figure 4A:
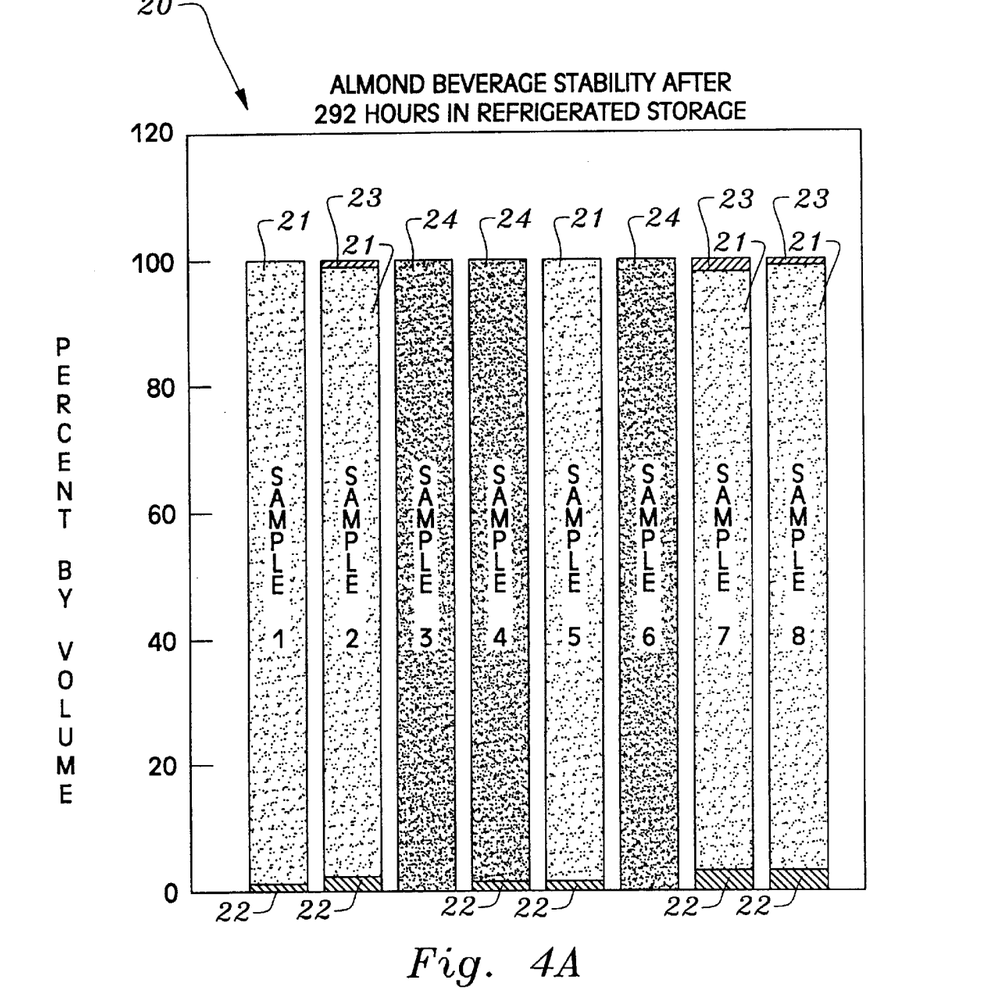
FIG. 4A is a graph comparing the stability of eight test samples of almond beverages after 292 hours in refrigerated storage, in which the samples varied in composition from no added ingredients to three added ingredients.

It has been determined that the omission of certain of these ingredients, or the use of an improper amount of any of them, will result in a nut beverage which is either non-functional for the intended purposes herein, or commercially unacceptable as unstable during anticipated shelf life for the product. FIG. 4A illustrates the stability of beverage samples made from almond nut, including all, some, and none of the essential ingredients described above. Each sample was prepared as indicated in chart 20, and placed into refrigerated storage for 292 hours before the visual observations were made.

Sample 1, which included all three of the essential ingredients, shows a very high percentage of stable, homogeneous liquid 21, and a very small percentage of sediment 22. A homogeneous liquid 21 is stable, having a milky, consistent appearance, which does not appear to contain defects. Sediment 22 refers to a recognizable layer of sediment material at the bottom of the beverage sample, with a liquid interface boundary above it.

Sample 2, which included lecithin and carrageenan gum, but no citrate salt, displays a slight increase in the percentage of sediment 22 over sample 1, and the addition of a small amount of cream 23. Cream 23 is identified by a material floating to the surface of the beverage sample, with a liquid interface boundary below it.

Sample 3 included only the added ingredient of lecithin, resulting in an beverage comprised entirely of a non-homogeneous liquid 24. This liquid 24, which is alternatively referred to as an unstable liquid, includes minor and major defects such as flocculation, clear water cracks in the beverage, and liquid clearing.

Sample 4 included only the added ingredient of carrageenan gum. Sample 4 displays a very high percentage of non-homogeneous liquid 24, and a small percentage of sediment 22. Both citrate salt and carrageenan gum were added to Sample 5, resulting in a very high percentage of homogeneous liquid 21, and a very small percentage of sediment 22. Sample 6 included no additional ingredients, resulting in a completely non-homogeneous liquid 24. In sample 7, only citrate salt was added. Sample 7 displays a high percentage of homogeneous liquid 21, and small amounts of cream 23 and sediment 22. Lastly, sample 8, including citrate salt and lecithin, is very similar to the makeup of sample 7, with the amount of cream 23 being reduced significantly.

Figure 4B:
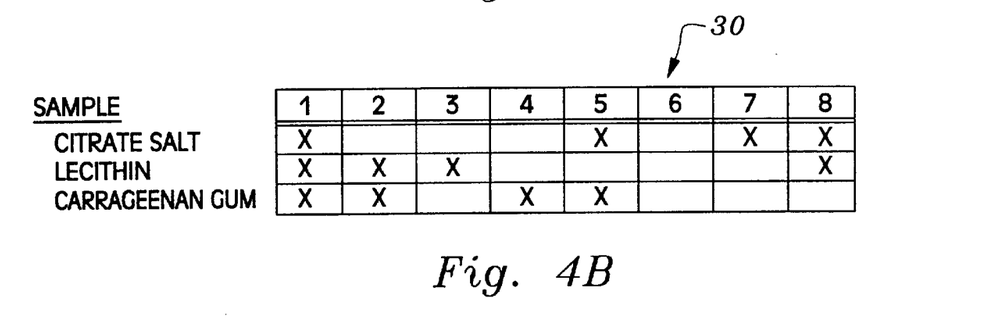
FIG. 4B is a chart having vertical columns corresponding to samples 1–8 in FIG. 4A, showing which, if any, of the three added ingredients is present in the respective sample.
Figure 4C:
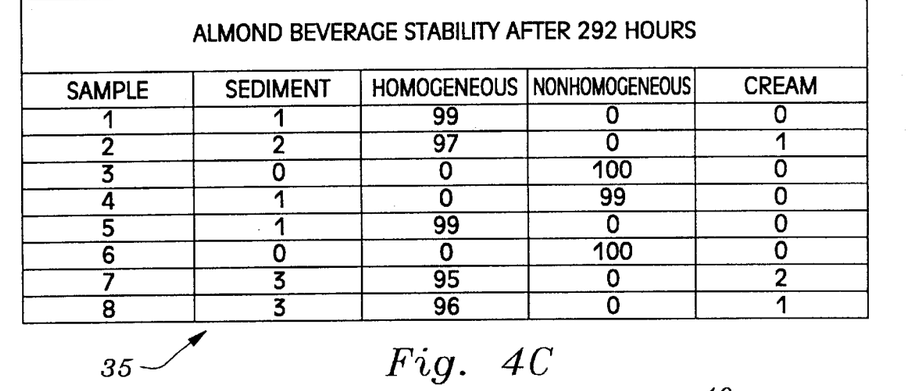
FIG. 4C is a chart for the eight samples of FIG. 4A, showing respective volumetric percentages for sediment, homogeneity, non-homogeneity, and, cream; and, FIG. 5 is a chart displaying the functional stability of the eight test samples of FIG. 4A, when each sample is mixed with strong coffee and observed over a period of time.

Aspects of this data are alternatively presented in FIGS. 4B and 4C, for further clarification. In FIG. 4B, chart 30 presents the critical ingredient distribution in samples 1–8. In FIG. 4C, chart 35 presents the data from FIG. 4A in numerical fashion.

One conclusion apparent from the results of this stability test is that at least two of the three ingredients from the selected group of ingredients must be present, to provide a reasonably acceptable degree of stability and homogeneity in the beverage. Sample 3, which included only lecithin as an added ingredient, and Sample 4, which included only carrageenan gum as an added ingredient, are both non-homogeneous liquids. Sample 6, which included no added ingredients, also resulted in a non-homogeneous liquid. However, Samples 2, 5 and 8, which included different respective permutations of at least two of the ingredients from the group, are reasonably homogeneous. Sample 1, which included all three ingredients, was the most homogeneous of the samples. Thus, one can enjoy a significant advantage in the homogeneity of the beverage, by using at least two of the three critical ingredients in combination; however, the best results are obtained by using all three of the ingredients together.

Figure 5:
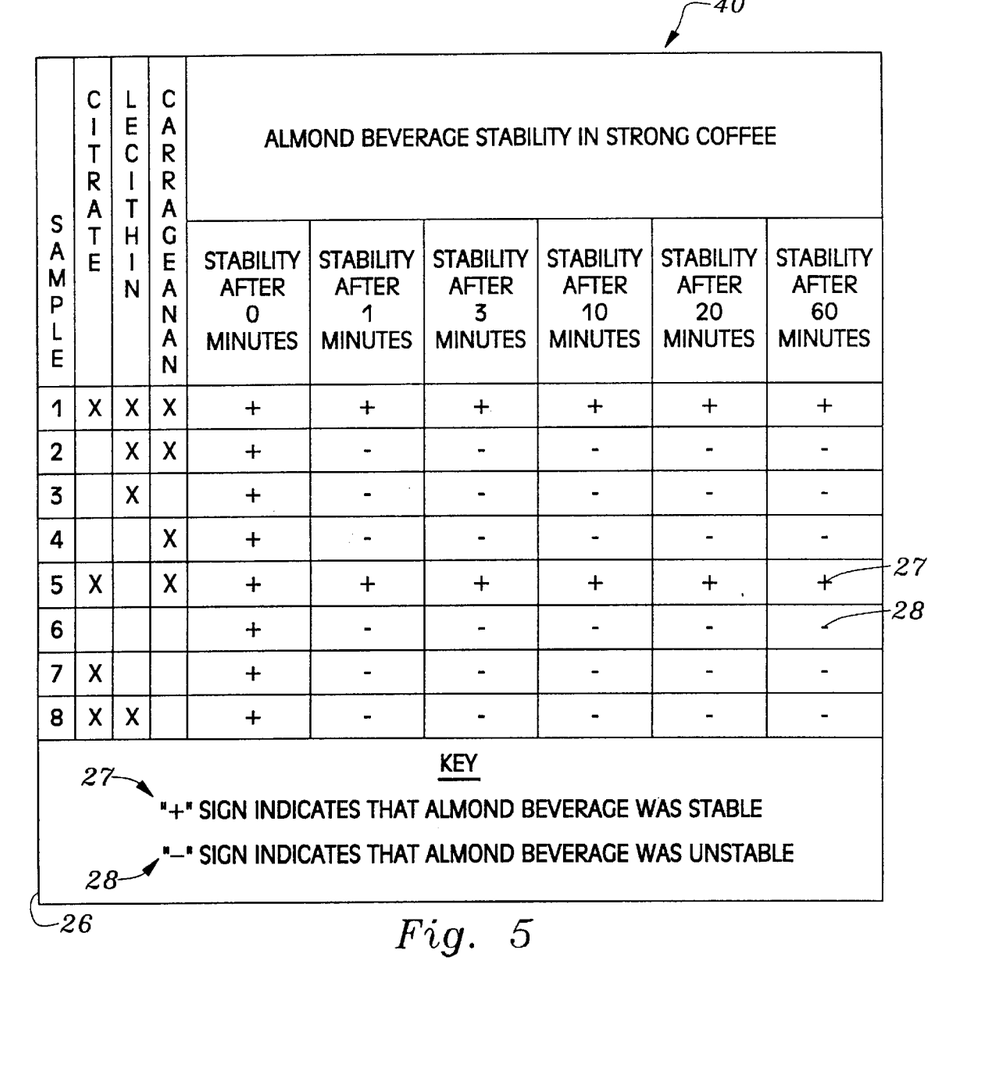

Another aspect of nut beverage acceptability for consumer use, is its functional compatibility with foods or other liquids. Consumers expect that a nut beverage should combine and be used with foods and other liquids, as milk does. An acceptable nut beverage, for example, should remain stable when mixed with hot, strong coffee. In FIG. 5, chart 40 depicts the results of mixing the eight samples of nut beverage shown in FIG. 4A, with hot, strong coffee.

As indicated in the KEY 26, a "+" sign 27, indicates that the beverage was stable in strong coffee. Stability in this instance means that the coffee and nut beverage mixture was homogeneous, having an appearance similar to dairy milk and coffee, and evidencing no separation or flocculation of the nut beverage. A "−" sign 28 indicates that the beverage was unstable in strong coffee. Instability in this instance means that the coffee and nut beverage mixture was not homogeneous, and that separation and flocculation of the nut beverage were evident.

While all of the samples are stable immediately after the mixing took place, all of the samples except samples 1 and 5 became unstable, after the passage of only one minute. This early trend did not change, even after one hour of observation. As with the samples in FIG. 4A, Sample 1 included all three of the critical ingredients (citrate salt, lecithin, and carrageenan gum), and Sample 5 included only citrate salt and carrageenan gum. Consequently, the functional compatibility advantages of the present invention, when the beverage is mixed with hot coffee, can be realized by using either all three of the ingredients of the selected group, or the two combined ingredients of citrate salt and carrageenan gum.

It is apparent from the stability and functional compatibility tests that at least two ingredients from the selected group of ingredients must be dispersed throughout the nut butter, to practice the invention successfully. It is also important that these ingredients are present within a range of relative amounts, or ratios. In the examples explained below, specific amounts of the ingredients will be identified. It should be pointed out, however, that one having ordinary skill in the art can modify these specific amounts within a range and still achieve the benefits of the invention. Thus, in a particular formulation, one might decrease the relative amount of citrate salt and increase the relative amount of carrageenan gum from those specific amounts set forth in the examples, and still obtain the desired results of beverage stability and functional compatibility.

Returning now to FIG. 1, some circumstances may call for adding optional ingredients 19 while the dispersing/mixing step 17 is carried out. These optional ingredients may include sweeteners, salts, vitamin supplements, natural flavors, and protein, vegetable, or grain ingredients. This early addition of optional ingredients would be appropriate where the customer has ordered a specially formulated concentrate, ready for direct conversion into a beverage without the addition of other ingredients. Alternatively, or in addition, these optional ingredients may be added at a later time, when the nut beverage concentrate is further amended into an unprocessed nut beverage, to be discussed i n more detail below.

If a sweetener is to be added, it is desirable to use a natural sweetener, such as washed raw sugar, cane syrup, fruit syrup, rice syrup, or cereal malt. This sweetener should be added in the amount of approximately 0.10 to 20 parts by weight, to one part of nut butter. The specific amount of sweetener used depends upon the nature of the commercial product and consumer preference. Natural washed raw sugar provides the advantage that it adds sweetness to nut beverages without covering or masking the natural roasted nut flavor, as some cereal or grain type sweeteners may do. It should also be noted that the use of different types of sweeteners in amounts which diverge from the teachings herein, may adversely influence the stability of the nut beverage.

Another optional ingredient which is quite important to consumer acceptance of the beverage is salt. Natural sea salt, in the amount of 0.01 to 0.25 parts by weight, to one part of nut butter, provides a satisfactory level of salinity to the beverage. Without the proper amount of salt, the nut beverage flavor is weak and "metallic". As with sweetener, the amount of salt can also affect the stability of the nut beverage.

Another optional ingredient is calcium salt, such as tricalcium phosphate, in an amount typically ranging from 0.01 to 0.5 parts by weight, to one part of nut butter. Such calcium salt functions as a nutrient source of calcium, with the specific amount used being dependent upon nutritional requirements. Calcium salt also directly affects the suspension stability of the nut beverage.

Natural vitamin supplements, such as Vitamin A palmitate, Vitamin D, and Vitamin E may be added in amounts calculated to satisfy nutritional requirements. It should be noted, however, that excessive amounts of such vitamin supplements can adversely affect the flavor of the nut beverage.

Natural flavors, including vanilla, cocoa, and others, may be added as optional ingredients, as well. Although the beverage is a nut-based beverage, such additional flavors may supplement and compliment the natural roasted nut flavors and satisfy consumer desires for different varieties of nut beverages. Of course, if the proportion of an added flavor is too high, it will mask the distinctive roasted nut flavors of the beverage.

A last group of optional ingredients includes protein, vegetable, or grain. Each of these ingredients can profoundly affect the stability, functionality, and flavor of the nut beverage. However, providing the amounts are not excessive and the ingredient's characteristics are desirable in the beverage, such amendments may be added to the nut butter 16 during the dispersing/mixing step 17, along with the essential ingredients 18.

Completion of the dispersing/mixing step 17 results in a highly viscous, nut beverage concentrate 11. The concentrate is shelf stable, and does not require refrigeration to prevent spoilage. Typical water amounts in the concentrate 11 range from 1% to 3%, by weight. Large containers, such as drums, pails, totes, and the like, may be used for convenient transport and storage of the concentrate to processing locations remote from the concentrate manufacturing facility. The proper proportions of essential and optional ingredients are already present in the concentrate, making further processing of the concentrate into a beverage, a relatively straightforward procedure.

At the concentrate processing facility, the first step undertaken is adding potable water 31 to the nut beverage concentrate 11. The amount of concentrate used is dependent upon the desired nut or fat content in the finished beverage product. Typically, this amount would fall within the range of 0.1% to 20% of the weight of the beverage product. In the next step, several minutes of high shear mixing 29 disperses and dissolves the concentrate throughout the liquid mixture. This mixing occurs in a high shear mixing tank, using conventional apparatus, well known in the art. A further step of adding optional ingredients 32, such as natural sugar, is taken, followed by additional high shear mixing. This results in a rudimentary emulsion and suspension of the nut butter particles, with the liquid now being characterized as an unprocessed nut beverage 33.

Owing to the fine particle size achieved during the nut grinding step 14, filtering or centrifuging the beverage 33 is not required. In this manner, the full nutritional value of the ground nuts, including the nut fiber, is retained in the beverage.

In a next step, the beverage 33 is thermally processed and pasteurized 34, under sterile or aseptic conditions, using commercially available equipment. This results in sterilization of the beverage 33, and also assists in complete dissolution of soluble ingredients. However, it should be noted that unless the essential ingredients discussed above are present in the proper amounts in the beverage, thermal processing can quickly flocculate and destabilize the beverage.

It has been determined that the type of thermal processing equipment and the duration of the heating cycle also have a significant effect on the stability of the beverage. For example, aseptic UHT ("Ultra-High Temperature") thermal processing equipment, utilizing tubular heat exchangers, have proven satisfactory, for carrying out this step. Applicant has successfully used such thermal processing manufactured by the Cherry Burrell company. Experimental testing has shown that a typical thermal cycle hold time is within the range of four to ten seconds at a temperature of 284° F. to 290° F. Alternate thermal processing methods such as retort with associated longer heating times may result in a non-homogeneous, or destabilized beverage.

Following pasteurization, the beverage 33 is moderately, or partially, cooled and then subjected to homogenizing 36, also under aseptic conditions. Homogenization is important to effect further reduction in the size of the nut particles and the oil droplets in the beverage. Through the homogenization process, a more stable suspension and emulsion are provided, resulting in a long shelf life for the beverage. In a final processing step, cooling 37 is applied to the homogenized mixture, resulting in a fully processed nut beverage 38.

Packaging 39 is required to contain and protect metered amounts of the processed beverage 38, for distribution and sale to consumers. As one alternative, the nut beverage may be aseptic packaged 41. Such packaging does not require refrigeration of the product, and provides a compact and convenient means of beverage containment. Alternatively, the nut beverage 38 may be refrigerant packaged 42, in cartons, cans, or bottles.

Figure 2:
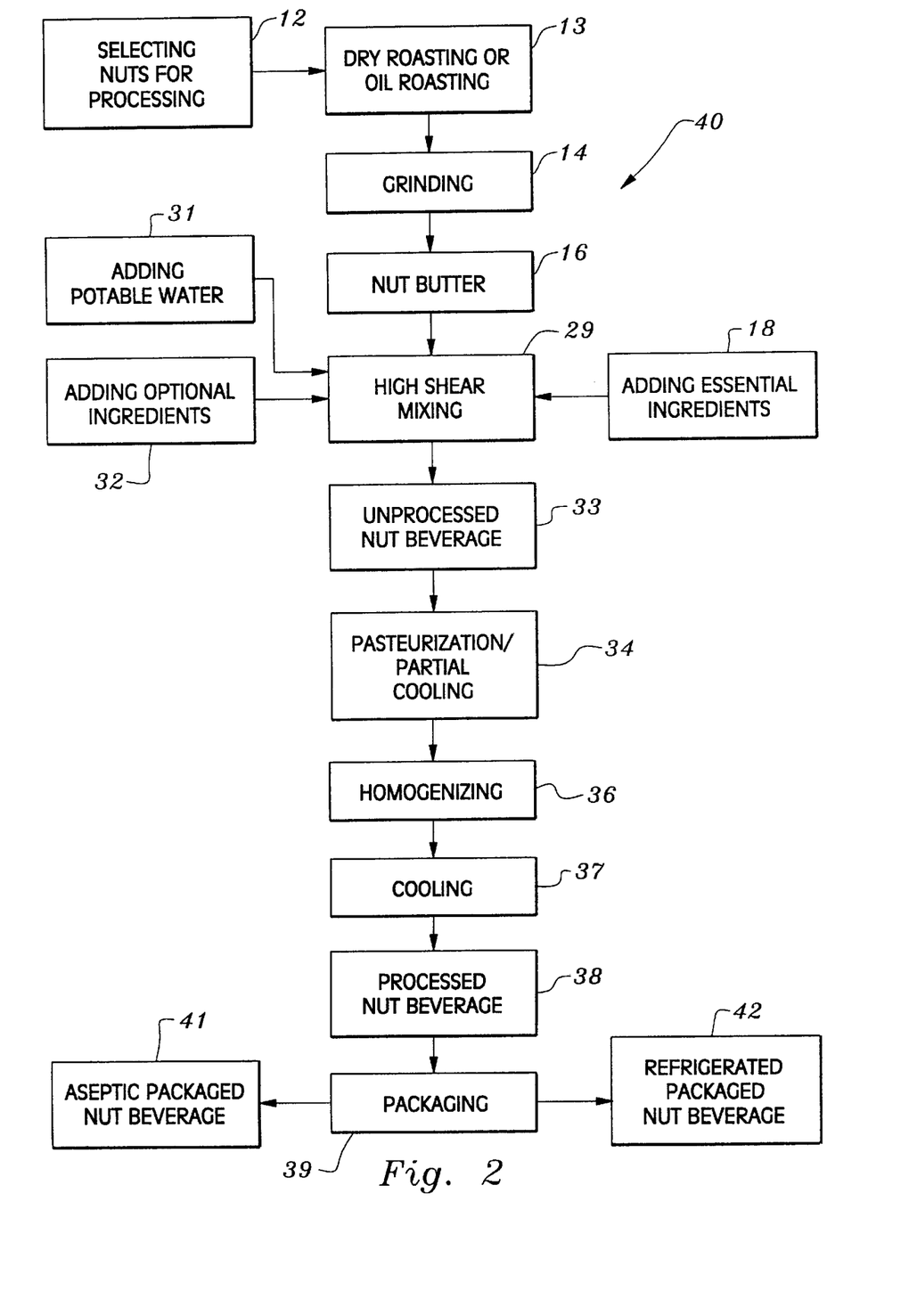
FIG. 2 is a flow chart showing the process for producing a directly consumable, nut beverage.

Making reference now to FIG. 2, another process 40, for producing a directly consumable form of the nut-based beverage, will now be described. Rather than producing an intermediate form of the beverage, identified above as the nut beverage concentrate 11, this second process contemplates producing the nut beverage in a form immediately ready for consumption. Thus, the entire beverage manufacturing process is undertaken and completed at one location, on a continuous or batch basis.

Since many of steps used to make the directly consumable form of the beverage are identical to those described above for making the nut beverage concentrate 11, the same numerical designations will be used wherever possible, for purposes of simplification and clarity.

Having selected the nuts for processing 12, and completed the dry or oil roasting 13 of those nuts, grinding 14 is undertaken until a nut butter 16 is produced. The pure nut butter 16, preferably without additives at this point, is introduced to a high shear mixing tank. After adding potable water 31 in the desired amount, the nut butter and water mixture is subjected to high shear mixing 29. This mixing is continued for several minutes, to disperse and dissolve the nut butter.

The next steps require adding essential ingredients 18 and adding optional ingredients 32, to the butter/water mixture in the tank. The proportions and kinds of these ingredients are the same as those previously described, in connection with the concentrate beverage. Additional high shear mixing 29 follows, to dissolve the ingredients and begin the formation of emulsion and suspension of particles in solution.

Further processing of the resultant unprocessed nut beverage 33 takes place in a manner identical to that set forth above. The thermal processing 34, homogenizing 36, and cooling 37 produce a processed nut beverage 38. Packaging 39 may take the form of aseptic packaging 41 or refrigerated packaging 42. In this manner, a directly consumable form of the nut beverage may be produced.

Having explained the two basic processes for manufacturing the nut-based non-dairy beverage of the present invention, a series of specific examples in carrying out the teachings will now be described.

EXAMPLE 1
Nut Beverage Concentrate

A selected nut such as almond, hazelnut, or Macadamia is roasted and ground into a nut butter. The butter is introduced into a mixing tank with other ingredients, having the following proportional parts, by weight: 75.5 nut butter; 3.0 parts lecithin; 5.7 parts potassium citrate; 5.7 parts sea salt; 7.5 parts tricalcium phosphate; and, 2.6 parts carrageenan gum, comprised of 0.4 parts Kappa and 2.2 parts Iota carrageenan gum. Following a dispersing/mixing step, the concentrate is packaged into suitable containers, for future use as base ingredient used in the manufacture of a nut beverage.

EXAMPLE 2
Plain Nut Beverage Manufactured From Concentrate

In a high shear mixer tank, 2.5 parts by weight of almond, hazelnut, or Macadamia beverage concentrate is combined with 3.0 parts by weight of washed raw sugar and 94.5 parts by weight of potable water. All ingredients are subjected to high shear mixing for several minutes to form an incipient emulsion with particle suspension. The resultant mixture is UHT processed on an aseptic system using tubular heat exchangers, at a temperature typically within the range of 285° F.–295° F. for 5 to 15 seconds. Following thermal processing, the beverage is homogenized, cooled, and packaged in sterile containers.

EXAMPLE 3
Plain Almond Beverage From Nut Butter

In a high shear mixing tank, the following ingredients are combined, in the following proportions, by weight: 94.35 parts of potable water; 2.0 parts of blanched almond nut butter; 0.08 parts of lecithin; 0.15 parts of potassium citrate; 3.0 parts of washed raw sugar; 0.15 parts of sea salt; 0.20 parts of tricalcium phosphate; and, 0.07 parts of carrageenan gum, comprised of 0.01 parts Kappa and 0.06 parts Iota carrageenan gum. Following mixing, the unprocessed nut beverage is subjected to the same thermal processing, homogenizing, cooling, and packaging steps, set forth in Example 2.

EXAMPLE 4
Hazelnut Beverage From Nut Butter

In a high shear mixing tank, the following ingredients are combined, in the following proportions, by weight: 93.33 parts of potable water; 2.0 parts of blanched hazelnut butter; 0.08 parts of lecithin; 0.15 parts of potassium citrate; 4.0 parts of washed raw sugar; 0.15 parts of sea salt; 0.20 parts of tricalcium phosphate; 0.07 parts of carrageenan gum, comprised of 0.01 parts Kappa and 0.06 parts Iota carrageenan gum; 0.02 parts of two fold natural vanilla; 0.00275 parts of vitamin E in vegetable oil (1250 IU/g); 0.00005 parts of Vitamin D3 in vegetable oil (1M IU/g); and 0.00016 parts of Vitamin A in vegetable oil (1.6M IU/g). Following mixing, the unprocessed nut beverage is subjected to the same thermal processing, homogenizing, cooling, and packaging steps, set forth in Example 2.

EXAMPLE 5
Vanilla Almond Beverage From Nut Butter

In a high shear mixing tank, the following ingredients are combined, in the following proportions, by weight: 91.18 parts of potable water; 2.0 parts of blanched almond butter; 0.08 parts of lecithin; 0.15 parts of potassium citrate; 6.0 parts of washed raw sugar; 0.15 parts of sea salt; 0.20 parts of tricalcium phosphate; 0.07 parts of carrageenan gum, comprised of 0.01 parts Kappa and 0.06 parts Iota carrageenan gum; 0.17 parts of three fold natural vanilla; 0.00275 parts of vitamin E in vegetable oil (1250 IU/g); 0.00005 parts of Vitamin D3 in vegetable oil (IM IU/g); and 0.00016 parts of Vitamin A in vegetable oil (1.6M IU/g). Following mixing, the unprocessed nut beverage is subjected to the same thermal processing, homogenizing, cooling, and packaging steps, set forth in Example 2.

EXAMPLE 6
Chocolate Almond Beverage From Nut Butter

In a high shear mixing tank, the following ingredients are combined, in the following proportions, by weight: 88.64 parts of potable water; 2.0 parts of blanched almond butter; 0.08 parts of lecithin; 0.15 parts of potassium citrate; 8.0 parts of washed raw sugar; 0.15 parts of sea salt; 0.20 parts of tricalcium phosphate; 0.08 parts of carrageenan gum, comprised of 0.02 parts Kappa and 0.06 parts Iota carrageenan gum; 0.6 parts of Dutch process cocoa powder; 0.10 parts of two fold natural vanilla; 0.00275 parts of vitamin E in vegetable oil (1250 IU/g); 0.00005 parts of Vitamin D3 in vegetable oil (IM IU/g); and 0.00016 parts of Vitamin A in vegetable oil (1.6M IU/g). Following mixing, the unprocessed nut beverage is subjected to the same thermal processing, homogenizing, cooling, and packaging steps, set forth in Example 2.

EXAMPLE 7
Macadamia Beverage From Nut Butter

In a high shear mixing tank, the following ingredients are combined, in the following proportions, by weight: 93.33 parts of potable water; 2.0 parts of Macadamia butter; 0.08 parts of lecithin; 0.15 parts of potassium citrate; 4.0 parts of washed raw sugar; 0.15 parts of sea salt; 0.20 parts of tricalcium phosphate; 0.07 parts of carrageenan gum, comprised of 0.01 parts Kappa and 0.06 parts Iota carrageenan gum; and, 0.02 parts of two fold natural vanilla. Following mixing, the unprocessed nut beverage is subjected to the same thermal processing, homogenizing, cooling, and packaging steps, set forth in Example 2.

It will be appreciated, then, that I have disclosed both a process and a product for a nut-based non-dairy beverage, both in concentrated and in consumable form, which exhibits superior shelf life and taste, while eliminating certain health problems associated with dairy products.

What is claimed is:

1. A process for producing a non-dairy beverage concentrate from nuts, consisting essentially of the steps of:
   a. grinding a quantity of nuts into a nut butter;
   b. adding a citrate salt and only one surfactant to the nut butter, said one surfactant being lecithin or an equivalent thereof; and,
   c. dispersing and mixing said citrate salt and said one surfactant into the nut butter.

2. A process as in claim 1 in which said citrate salt is added in an approximate range of 0.005 to 0.3 parts, by weight, to one part of nut butter, and in which said one surfactant is lecithin added in an approximate range of 0.002 to 0.3 parts, by weight, to one part of nut butter.

3. A process as in claim 1 in which one or more optional ingredients is added to the nut butter, said ingredients including sweeteners, salts, vitamin supplements, natural flavors, protein, vegetables, or grains.

4. A process as in claim 1 including the following additional steps for processing the nut butter into a nut beverage:
   d. adding potable water to the nut butter;
   e. subjecting the nut butter and the water to high shear mixing, producing an unprocessed nut beverage;
   f. subjecting said unprocessed nut beverage to pasteurization and partial cooling;
   g. homogenizing said unprocessed nut beverage;
   h. cooling said unprocessed nut beverage, producing a processed nut beverage; and,
   i. either aseptically packaging or refrigerate packaging said processed nut beverage.

5. A process as in claim 1 in which said citrate salt is selected from a sub-group consisting of potassium citrate and sodium citrate.

6. A process as in claim 5 in which said citrate salt is present in an amount of 0.005 to 0.3 parts, by weight, to one part of nut butter.

7. A process as in claim 1 in which said one surfactant is a natural, non-hydroxylated, soy-based lecithin.

8. A process as in claim 7 in which said natural, non-hydroxylated, soy-based lecithin is present in an amount of 0.002 to 0.3 parts, by weight, to one part of nut butter.

9. A process as in claim 7 in which said lecithin has an HLB between 4 and 10.

10. A process for producing a non-dairy beverage concentrate from nuts, consisting essentially of the steps of:
    a. grinding a quantity of nuts into a nut butter;
    b. adding a citrate salt and a carrageenan gum to the nut butter; and,
    c. dispersing and mixing said citrate salt and said carrageenan gum into the nut butter.

11. A process as in claim 10 in which said citrate salt is added in an approximate range of 0.005 to 0.3 parts, by weight, to one part of nut butter, and in which said carrageenan gum is added in an approximate range of 0.002 to 0.25 parts, by weight, to one part of nut butter.

12. A process as in claim 10 in which one or more optional ingredients is added to the nut butter, said ingredients including sweeteners, salts, vitamin supplements, natural flavors, protein, vegetables, or grains.

13. A process as in claim 10 including the following additional steps for processing the nut butter into a nut beverage:
    d. adding potable water to the nut butter;
    e. subjecting the nut butter and the water to high shear mixing, producing an unprocessed nut beverage;
    f. subjecting said unprocessed nut beverage to pasteurization and partial cooling;
    g. homogenizing said unprocessed nut beverage;
    h. cooling said unprocessed nut beverage, producing a processed nut beverage; and,
    i. either aseptically packaging or refrigerate packaging said processed nut beverage.

14. A process as in claim 10, in which said carrageenan gum is comprised of Kappa and Iota carrageenan gum.

15. A process as in claim 14, in which said Kappa and Iota carrageenan gum together have a total weight in a range of 0.002 to 0.25 parts, by weight, to one part of nut butter.

16. A process as in claim 10 in which said citrate salt is selected from a sub-group consisting of potassium citrate and sodium citrate.

17. A process as in claim 16 in which said citrate salt is present in an amount of 0.005 to 0.3 parts, by weight, to one part of nut butter.

18. A process for producing a non-dairy beverage concentrate from nuts, consisting essentially of the steps of:
    a. grinding a quantity of nuts into a nut butter;
    b. adding only one surfactant and a carrageenan gum to the nut butter, said one surfactant being lecithin or an equivalent thereof; and,
    c. dispersing and mixing said one surfactant and said carrageenan gum into the nut butter.

19. A process as in claim 18 in which said one surfactant is lecithin added in an approximate range of 0.002 to 0.3 parts, by weight, to one part of nut butter, and in which said carrageenan gum is added in an approximate range of 0.002 to 0.25 parts, by weight, to one part of nut butter.

20. A process as in claim 18 in which one or more optional ingredients is added to the nut butter, said ingredients including sweeteners, salts, vitamin supplements, natural flavors, protein, vegetables, or grains.

21. A process as in claim 18 including the following additional steps for processing the nut butter into a nut beverage:
    d. adding potable water to the nut butter;
    e. subjecting the nut butter and the water to high shear mixing, producing an unprocessed nut beverage;
    f. subjecting said unprocessed nut beverage to pasteurization and partial cooling;
    g. homogenizing said unprocessed nut beverage;
    h. cooling said unprocessed nut beverage, producing a processed nut beverage; and,
    i. either aseptically packaging or refrigerate packaging said processed nut beverage.

22. A process as in claim 18 in which said one surfactant is a natural, non-hydroxylated, soy-based lecithin.

23. A process as in claim 22 in which said natural, non-hydroxylated, soy-based lecithin is present in an amount of 0.002 to 0.3 parts, by weight, to one part of nut butter.

24. A process as in claim 22 in which said lecithin has an HLB between 4 and 10.

25. A process as in claim 18, in which said carrageenan gum is comprised of Kappa and Iota carrageenan gum.

26. A process as in claim 25, in which said Kappa and Iota carrageenan gum together have a total weight in a range of 0.002 to 0.25 parts by weight to one part of nut butter.

27. A process for producing a non-dairy beverage concentrate from nuts, consisting essentially of the steps of:
   a. grinding a quantity of nuts into a nut butter;
   b. adding a citrate salt, only one surfactant, and a carrageenan gum to the nut butter, said one surfactant being lecithin or an equivalent thereof; and,
   c. dispersing and mixing said citrate salt, said one surfactant, and said carrageenan gum into the nut butter.

28. A process as in claim 27 in which said citrate salt, said one surfactant, and said carrageenan gum are added in the following amounts, by weight, to one part of nut butter: said citrate salt in an approximate range of 0.005 to 0.3; said one surfactant in an approximate range of 0.002 to 0.3; and, said carrageenan gum in an approximate range of 0.002 to 0.25.

29. A process as in claim 27 in which one or more optional ingredients are added to the nut butter, said ingredients including sweeteners, salts, vitamin supplements, natural flavors, protein, vegetables, or grains.

30. A process as in claim 27 including the following additional steps for processing the nut butter into a nut beverage:
   d. adding potable water to the nut butter;
   e. subjecting the nut butter and the water to high shear mixing, producing an unprocessed nut beverage;
   f. subjecting said unprocessed nut beverage to pasteurization and partial cooling;
   g. homogenizing said unprocessed nut beverage;
   h. cooling said unprocessed nut beverage, producing a processed nut beverage;
   i. either aseptically packaging or refrigerate packaging said processed nut beverage.

31. A process as in claim 27, in which said carrageenan gum is comprised of Kappa and Iota carrageenan gum.

32. A process as in claim 31 in which said Kappa and Iota carrageenan gum together have a total weight in a range of 0.002 to 0.25 parts, by weight, to one part of nut butter.

33. A process as in claim 27 in which said citrate salt is selected from a sub-group consisting of potassium citrate and sodium citrate.

34. A process as in claim 27 in which said citrate salt is present in an amount of 0.005 to 0.3, parts by weight, to one part of nut butter.

35. A process as in claim 27 in which said one surfactant is a natural, non-hydroxylated, soy-based lecithin.

36. A process as in claim 35 in which said natural, non-hydroxylated, soy-based lecithin is present in an amount of 0.002 to 0.3, parts by weight, to one part of nut butter.

37. A process for producing a non-dairy, paste concentrate from a quantity of nuts consisting essentially of the steps of:
   roasting a quantity of nuts until it has a moisture content of approximately 4%, or less;
   b. grinding said quantity until the nuts have a particle size consistent with a nut butter;
   c. adding the following ingredients to said concentrate: potassium or sodium citrate having a concentration within a range of 0.005 to 0.3 parts, by weight, to one part of nut butter; only one surfactant having a concentration within a range of 0.002 to 0.3 parts, by weight, to one part of nut butter, said one surfactant being lecithin or an equivalent thereof; and, carrageenan gum having a concentration within a range of 0.002 to 0.25 parts, by weight, to one part of nut butter.

38. A process as in claim 37 in which said nut is selected from the group consisting of almonds, hazelnuts, Macadamia nuts, Brazil nuts, cashews, pistachios, peanuts, and walnuts.

39. A process as in claim 37 further including the step of adding sugar to the concentrate.

40. A process as in claim 37 further including the step of adding salt to the concentrate.

41. A process as in claim 37 further including the step of adding tricalcium phosphate to the concentrate.

42. A process as in claim 37 further including the step of adding a natural vitamin supplement to the concentrate.

43. A process as in claim 37 further including the step of adding a flavoring ingredient to the concentrate.

44. A process as in claim 37 in which said one surfactant is a natural, non-hydroxylated, soy-based lecithin having a concentration within a range of 0.002 to 0.3 parts, by weight, to one part of nut butter.

* * * * *